(12) United States Patent
Oguro et al.

(10) Patent No.: US 7,067,186 B2
(45) Date of Patent: Jun. 27, 2006

(54) THERMOPLASTIC RESIN COMPOSITION

(75) Inventors: Dai Oguro, Kanagawa (JP); Takeo Hayashi, Kanagawa (JP); Masahiro Kurokawa, Kanagawa (JP); Tsuyoshi Ikeda, Kanagawa (JP); Takeshi Hirokane, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 106 days.

(21) Appl. No.: 10/499,120

(22) PCT Filed: Dec. 20, 2002

(86) PCT No.: PCT/JP02/13377

§ 371 (c)(1),
(2), (4) Date: Jun. 17, 2004

(87) PCT Pub. No.: WO03/054084

PCT Pub. Date: Jul. 3, 2003

(65) Prior Publication Data

US 2005/0075466 A1 Apr. 7, 2005

(30) Foreign Application Priority Data

Dec. 21, 2001 (JP) ............................. 2001-389877

(51) Int. Cl.
*C08L 69/00* (2006.01)
*C08L 67/02* (2006.01)
(52) U.S. Cl. ........................ 428/220; 525/439; 528/300
(58) Field of Classification Search ...................... None
See application file for complete search history.

(56) References Cited

U.S. PATENT DOCUMENTS 2,945,008 A * 7/1960 Caldwell et al. ............... 528/73
3,860,611 A * 1/1975 Krespan ...................... 549/351
4,833,217 A   5/1989 Igi et al.
4,874,647 A * 10/1989 Yatsu et al. ................ 428/35.7
5,942,585 A   8/1999 Scott et al.
2001/0034419 A1 10/2001 Kanayama et al.

FOREIGN PATENT DOCUMENTS

| EP | 0 856 559 A2 | 8/1998 |
|----|---|---|
| EP | 0 962 478 A2 | 12/1999 |
| EP | 1 164 155 A1 | 12/2001 |
| JP | 62-265361 | 11/1987 |
| JP | 01 252658 A | 10/1989 |
| JP | 10 147698 | 6/1998 |
| JP | 2000 001604 | 1/2000 |

OTHER PUBLICATIONS

Supplementary European Search Report of corresponding European patent application EP 02 78 6176, dated Mar. 4, 2005.
International Search Report, date of mailing February 12, 2003, for No. PCT/JP02/13377.

* cited by examiner

*Primary Examiner*—David J. Buttner
(74) *Attorney, Agent, or Firm*—Antonelli, Terry, Stout and Kraus, LLP.

(57) ABSTRACT

The invention provides a thermoplastic resin composition which is excellent in transparency, heat resistance, resistance to chemicals, and mechanical strength as well as moldability, printability, etc.

The thermoplastic resin composition containing a polycarbonate resin in an amount of 2 to 99.5 wt. % and a polyester resin in an amount of 98 to 0.5 wt. %, wherein the polyester resin (B) contains diol units each having a cyclic acetal skeleton in an amount of 20 to 60 mol % with respect to total diol structural units.

27 Claims, No Drawings

THERMOPLASTIC RESIN COMPOSITION

TECHNICAL FIELD

The present invention relates to a thermoplastic resin composition, which comprises a polycarbonate resin and a polyester resin and has excellent transparency, heat resistance, resistance to chemicals and mechanical strength as well as moldability, printability, etc., the polyester resin containing units derived from (hereinafter "units derived from" referred to simply as "unit") a diol having a cyclic acetal skeleton in a predetermined amount with respect to total diol structural units. The invention also relates to an injection molded product, a sheet, and a film, each being produced from the thermoplastic resin composition. The present invention also relates to another thermoplastic resin composition, which comprises the above thermoplastic composition and an organic and/or inorganic filler added thereto and which has excellent mechanical strength, heat resistance, and resistance to chemicals as well as moldability, printability, etc.

BACKGROUND ART

Polycarbonate resin (hereinafter may be referred to as "PC") having advantages such as heat resistance, impact resistance, and transparency, has been employed in various fields such as exterior materials, electronic and electric uses, and optical disk substrates. Polycarbonate resins having such advantages have further been applied to uses such as automobiles and medical materials. As applications expand, improvement of resistance to chemicals has been keenly demanded.

In order to improve resistance of PC to chemicals, there has been carried out melt mixing of a saturated polyester resin serving as a modifier into PC. For example, use of polyethylene terephthalate (hereinafter may be referred to as "PET") as a modifier for PC has been proposed. However, addition of PET is known to considerably impair transparency of PC. In order to solve this problem, measures currently undertaken include use of a method of melt mixing employing a long residence time and a method of melt mixing employing a Ti-base catalyst. However, even when these measures are taken, obtained transparency is not sufficient, and there arise problems of yellowing of the composition caused by thermal decomposition, and generation of gases such as aldehyde during decomposition. In addition, since PET has a relatively low glass transition temperature (Tg), heat resistance of the resin composition becomes very low, which is also problematic.

When polybutylene terephthalate resin (hereinafter may be referred to as "PBT") is employed as a modifier for PC, a certain level of transparency is attained. However, the transparency is not yet satisfactory, and heat resistance decreases considerably, which is also problematic. Meanwhile, there has been proposed a thermoplastic resin composition including PC and a modified PET, in which diol units are changed to 1,4-cyclohexanedimethanol units (40 mol %) (Japanese Patent Application Laid-Open (kokai) No. 2000-63641). However, the resin composition has a drawback of reduced heat resistance and poor resistance to chemicals, although the resin composition has good transparency.

There has also been proposed use, as a modifier for PC, of a copolymer polyester containing a predetermined proportion of naphthalenedicarboxylic acid units in the dicarboxylic acid units of the resin (Japanese Patent Application Laid-Open (kokai) No. 2000-103948). However, when naphthalenedicarboxylic acid units are incorporated into the dicarboxylic acid units in a proportion required for improving resistance to chemicals, transparency problematically decreases to an unsatisfactory level. Thus, hitherto, there has never been known a PC-polyester resin-based composition which maintains transparency and heat resistance of PC and which has improved resistance to chemicals.

Meanwhile, as compared with PCs, polyester resins such as PET, polyethylene naphthalate, and PBT are generally excellent in resistance to chemicals, moldability, printability, etc. but are poor in heat resistance, mechanical strength (particularly impact strength), and transparency. Thus, improvement of such poor physical properties is demanded.

For the purpose of improving properties of a polyester resin, such as heat resistance and impact strength, a thermoplastic resin produced by adding PC to the polyester through melt mixing has been proposed. However, as mentioned above, the thus-produced polyester resin has considerably poor transparency. Thus, hitherto, there has never been known a thermoplastic composition which has both improved heat resistance and improved mechanical strength (particularly impact strength) of polyester resin as well as high transparency.

As mentioned above, there has never been known a thermoplastic resin composition which is formed of a polycarbonate resin and a polyester resin and which has excellent transparency, heat resistance, resistance to chemicals, and mechanical strength (particularly impact strength) as well as moldability, printability, etc.

DISCLOSURE OF THE INVENTION

In view of the forgoing, an object of the present invention is to provide a thermoplastic resin composition, which comprises a polycarbonate resin and a specific copolymer polyester resin and which has excellent transparency, heat resistance, resistance to chemicals, and mechanical strength (particularly impact strength) as well as moldability, printability, etc. Another object of the invention is to provide an injection molded product, a sheet, and a film, each being produced from the thermoplastic resin composition. Still another object is to provide a thermoplastic resin composition, which comprises the above thermoplastic composition and an organic and/or inorganic filler added thereto and which has excellent mechanical strength, heat resistance, and resistance to chemicals as well as moldability, printability, etc.

The present inventors have carried out extensive studies so as to solve the aforementioned problems, and have found that a thermoplastic resin composition obtained through blending a polycarbonate resin with a copolymer polyester resin containing a predetermined amount of diol units having a cyclic acetal skeleton serving as polyester diol structural units has excellent transparency, heat resistance, resistance to chemicals, and mechanical strength as well as moldability, printability, etc. The present invention has been accomplished on the basis of this finding. Accordingly, the present invention is directed to the following (1) to (5).

(1) A thermoplastic resin composition (C) comprising a polycarbonate resin (A) and a polyester resin (B), characterized in that the polyester resin (B) contains diol units each having a cyclic acetal skeleton in an amount of 20 to 60 mol % with respect to total diol structural units, and the thermoplastic resin composition (C) contains the polycarbonate resin (A) in an amount of 2 to 99.5 wt. % and the polyester resin (B) in an amount of 98 to 0.5 wt. %.

(2) An injection molded product produced from a thermoplastic resin composition (C) as recited in (1) above, the injection molded product exhibiting a total luminous transmittance of 87% or higher and a haze value of 4% or less as measured on a piece of the product having a thickness of 3.2 mm.

(3) A sheet produced from a thermoplastic resin composition (C) as recited in (1) above, the sheet exhibiting a total luminous transmittance of 87% or higher as measured on a piece of the sheet having a thickness of 1.0 mm.

(4) A film produced from a thermoplastic resin composition (C) as recited in (1) above, the film exhibiting a haze value of 4% or less as measured on a piece of the film having a thickness of 20 μm.

(5) A thermoplastic resin composition (D) comprising a thermoplastic resin composition (C) as recited in (1) above in an amount of 100 parts by weight and, added thereto, an organic and/or inorganic filler in an amount of 1 to 100 parts by weight.

BEST MODE FOR CARRYING OUT THE INVENTION

The thermoplastic resin composition (C) of the present invention includes a polycarbonate resin (A) in an amount of 2 to 99.5 wt. % and a polyester resin (B) in an amount of 98 to 0.5 wt. %, the polyester resin (B) containing diol units each having a cyclic acetal skeleton in an amount of 20 to 60 mol % with respect to total diol structural units.

The polycarbonate resin (A) used in the present invention includes repeating units represented by the following formula (1) and/or formula (2):

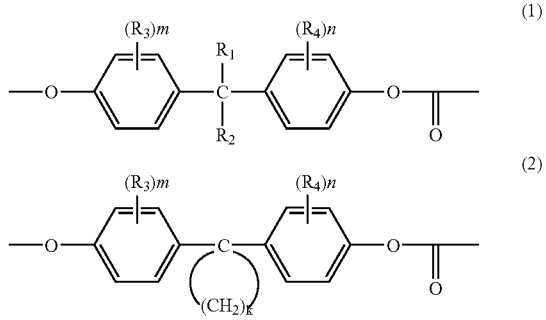

wherein each of $R_1$ and $R_2$ represents a hydrogen atom, a C1–C10 non-cyclic hydrocarbon group, or a C5–C10 alicyclic hydrocarbon group (e.g., methyl, ethyl, propyl, n-propyl, isobutyl, pentyl, or cyclohexyl); and each of $R_3$ and $R_4$ represents a C1–C10 non-cyclic hydrocarbon group, a halogen atom, or a phenyl group (e.g., methyl, ethyl, n-butyl, isobutyl, pentyl, phenyl, chlorine atom, or bromine atom); each of m and n is 0, 1, or 2; and k is 4 or 5.

No particular limitation is imposed on the aromatic hydroxy compound forming the polycarbonate resin (A) used in the present invention, and examples include bis(hydroxyaryl)alkanes such as 2,2-bis(4-hydroxyphenyl)propane (bisphenol A), 2,2-bis(3,5-dibromo-4-hydroxyphenyl)propane (tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(3-bromo-4-hydroxyphenyl)propane, and 2,2-bis(3,5-dichloro-4-hydroxyphenyl)propane; bis(hydroxyaryl)cycloalkanes such as 1,1-bis(4-hydroxyphenyl)cyclopentane, 1,1-bis(4-hydroxyphenyl)cyclohexane (bisphenol Z), 1,1-bis(3,5-dibromo-4-hydroxyphenyl)cyclohexane, and 1,1-bis(3,5-dichloro-4-hydroxyphenyl)cyclohexane; bis(hydroxyaryl)arylalkanes such as 1,1-bis(4-hydroxyphenyl)-1-phenylethane and 1,1-bis(4-hydroxyphenyl)diphenylmethane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone, resorcin, and 4,4'-dihydroxydiphenyl. Of these, bisphenol A is particularly preferred from the viewpoint of heat resistance, mechanical strength, cost, etc. of the thermoplastic resin composition (C).

The polycarbonate resin (A) of the present invention may have a branch structure. Such aromatic polycarbonate resins having a branch structure can be produced through use of a compound, for example, a polyhydroxy compound such as phloroglucin, 2,6-dimethyl-2,4,6-tris(4-hydroxyphenyl)-3-heptene, 4,6-dimethyl-2,4,6-tris(4-hydroxyphenyl)-2-heptene, 1,3,5-tris(2-hydroxyphenyl)benzole, 1,1,1-tris(4-hydroxyphenyl)ethane, 2,6-bis(2-hydroxy-5-methylbenzyl)-4-methylphenol, or α,α',α"-tris(4-hydroxyphenyl)-1,3,5-triisopropylbenzene; 3,3-bis(4-hydroxyaryl)oxyindole (=isatinbisphenol), 5-chloroisatinbisphenol, 5,7-dichloroisatinbisphenol, or 5-bromoisatinbisphenol.

The polycarbonate resin (A) used in the present invention preferably has a viscosity average molecular weight of 10,000 or higher form the viewpoint of maintenance of mechanical strength and preferably 30,000 or less from the viewpoint of moldability. Thus, the molecular weight more preferably falls within a range of 12,000 to 28,000, inclusive. When the viscosity average molecular weight falls within the above range, the thermoplastic resin (C) exhibits excellent mechanical strength and moldability.

The polycarbonate resin (A) used in the present invention is produced, for example, through reaction (interface polymerization) of the corresponding bisphenol with a carbonate precursor such as phosgene in a typical solvent such as methylene chloride in the presence of a known acid receptor or a chain-extender, or through transesterification (melt polymerization) of the corresponding bisphenol and a carbonate precursor such as diphenyl carbonate. The ratio of the amount of diol unit having a cyclic acetal skeleton to the total amount of diol structural units in the polyester resin (B) used in the present invention is 20 to 60 mol %, preferably 25 to 55 mol %, particularly preferably 30 to 50 mol %. When the amount of diol unit having a cyclic acetal skeleton contained in the polyester resin (B) is less than 20 mol % with respect to total diol structural units, transparency and heat resistance of the thermoplastic resin composition (C) are not improved sufficiently, whereas the amount is in excess of 60 mol %, transparency and mechanical strength (particularly impact strength) are not improved sufficiently.

The thermoplastic resin composition (C) employing the aforementioned polyester (B) exhibits remarkably excellent heat resistance, transparency, mechanical strength (see Examples 3, 16, 17, and Comparative Examples 1 and 2).

The diol having a cyclic acetal skeleton, which serves as a part of raw material monomers for producing the polyester resin (B) used in the present invention, is preferably a compound represented by formula (3) or (4). The diol is readily produced through reaction of any of hydroxyaldehydes with pentaerythritol (hereinafter referred to as "PE") or trimethylolpropane (hereinafter referred to as "TMP") in the presence of an acid catalyst. Examples of the diol include 3,9-bis(1,1-dimethyl-2-hydroxyethyl)-2,4,8,10-tetraoxaspiro[5.5]undecane (hereinafter referred to as "SPG") produced from PE and hydroxypivalaldehyde (intermediate for producing neopentyl glycol, hereinafter referred to as "HPA") and 5-methylol-5-ethyl-2-(1,1-dimethyl-2-hydroxyethyl)-1,3-dioxane produced from HPA and TMP. By use of the polyester resin (B) produced from the above compounds, the thermoplastic resin composition (C) of the present invention can provide injection molded products, sheets, films, and similar products having excellent transparency, heat resistance, resistance to chemicals, and mechanical strength as well as moldability, printability, etc. The compound is represented by formula (3):

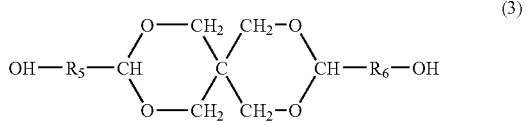
(3)

wherein each of $R_5$ and $R_6$ represents a functional group selected from among a C1–C10 non-cyclic hydrocarbon group, a C3–C10 alicyclic hydrocarbon group, and a C6–C10 aromatic hydrocarbon group, preferably a methylene group, an ethylene group, a propylene group, a butylene group, or a structural isomer thereof (e.g., an isopropylene group or an isobutylene group), or by formula (4):

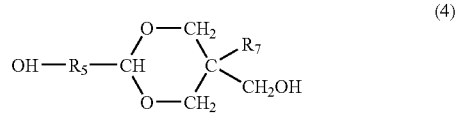
(4)

wherein $R_5$ has the same meaning as defined above; $R_7$ represents a functional group selected from among a C1–C10 non-cyclic hydrocarbon group, a C3–C10 alicyclic hydrocarbon group, and a C6–C10 aromatic hydrocarbon group, preferably a methyl group, an ethyl group, a propyl group, a butyl group, or a structural isomer thereof (e.g., an isopropyl group or an isobutyl group).

No particular limitation is imposed on the diol having no cyclic acetal skeleton, which serves as a raw material for producing the polyester resin (B) used in the present invention, and examples include aliphatic diols such as ethylene glycol, trimethylene glycol, 1,4-butanediol, 1,5-pentanediol, 1,6-hexanediol, diethylene glycol, and propylene glycol; polyether compounds such as polyethylene glycol, polypropylene glycol, and polybutylene glycol; alicyclic diols such as 1,3-cyclohexanedimethanol, 1,4-cyclohexanedimethanol, 1,2-decahydronaphthalenedimethanol, 1,3-decahydronaphthalenedimethanol, 1,4-decahydronaphthalenedimethanol, 1,5-decahydronaphthalenedimethanol, 1,6-decahydronaphthalenedimethanol, 2,7-decahydronaphthalenedimethanol, tetraline dimethanol, norbornanedimethanol, tricyclodecanedimethanol, and pentacyclododecanedimethanol; bisphenols such as 4,4'-(1-methylethylidene)bisphenol, methylenebisphenol (bisphenol F), 4,4'-cyclohexylidenebisphenol (bisphenol Z), and 4,4'-sulfonylbisphenol (bisphenol S); alkylene oxide adducts of bisphenol; aromatic dihydroxy compounds such as hydroquinone, resorcin, 4,4'-dihydroxybiphenyl, 4,4'-dihydroxydiphenyl ether, and 4,4'-dihydroxydiphenylbenzophenone; and alkylene oxide adducts of the aromatic dihydroxy compounds. Of these, ethylene glycol is particularly preferred from the viewpoint of mechanical strength and cost of the thermoplastic resin composition (C).

The polyester resin (B) used in the present invention preferably contains units derived from ethylene glycol in an amount of 80 to 40 mol % with respect to total diol structural units, more preferably 75 to 45 mol %, particularly preferably 70 to 50 mol %. When the above units are contained in an amount falling with in the above ranges, the thermoplastic resin composition (C) exhibits remarkably excellent transparency, mechanical strength, cost performance, etc.

The polyester resin (B) used in the present invention may further contain a monohydric alcohol such as butyl alcohol, hexyl alcohol, or octyl alcohol, or a polyhydric alcohol such as trimethyrolpropane, glycerin, or pentaerythritol in such an amount that does not impede the objects of the present invention.

No particular limitation is imposed on the dicarboxylic acid component of the polyester resin (B) used in the present invention, and examples include aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid, pentacyclododecanedicarboxylic acid, 3,9-bis(1,1-dimethyl-2-carboxyethyl)-2,4,8,10-tetraoxaspiro[5.5]undecane, and 5-carboxy-5-ethyl-2-(1,1-dimethyl-2-carboxyethyl)-1,3-dioxane; ester-formable derivatives of the aliphatic dicarboxylic acids; aromatic dicarboxylic acid such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid, and tetraline dicarboxylic acid; and ester-formable derivatives of the aromatic dicarboxylic acids.

Among these compounds, aromatic dicarboxylic acids and ester-formable derivatives thereof are preferred from the viewpoint of heat resistance, mechanical strength, resistance to chemicals, or other factors, with terephthalic acid, isophthalic acid, 2,6-naphthalenedicarboxylic acid, ester-formable derivatives thereof being particularly preferred. Through employment of terephthalic acid or and ester-formable derivative thereof, the thermoplastic resin composition (C) exhibits remarkably excellent transparency and mechanical strength and is produced at low cost, whereas through employment of 2,6-naphthalenedicarboxylic acid or an ester-formable derivative thereof, the thermoplastic resin composition (C) exhibits remarkably excellent transparency, resistance to chemicals, and heat resistance of the thermoplastic resin composition (C).

The ester-formable derivative of dicarboxylic acid of the present invention is a compound being capable of forming a dicarboxylic acid ester, and example include dicarboxylic acid dialkyl esters, dicarboxylic acid dihalides, and dicarboxylic acid diamides. Of these, dicarboxylic acid dialkyl esters are preferred, with dicarboxylic acid dimethyl esters being particularly preferred.

The polyester resin (B) generally contains aromatic dicarboxylic acid units in an amount of preferably 70 mol % or more with respect to total dicarboxylic acid structural units, more preferably 80 mol % or more, particularly preferably 90 mol % or more. By controlling the amount of the aromatic dicarboxylic acid units with respect to total dicarboxylic acid structural units of the polyester resin (B) to the aforementioned ranges, the thermoplastic resin composition (C) exhibits more excellent heat resistance, mechanical strength, and resistance to chemicals.

In the case where the polyester resin (B) containing aromatic dicarboxylic acid units in an amount of 70 mol % or more with respect to total dicarboxylic acid structural units further contains terephthalic acid units in the dicarboxylic acid structural units, the amount of terephthalic acid units in the dicarboxylic acid structural units preferably 20 to 100 mol %, more preferably 30 to 80 mol %, particularly preferably 40 to 60 mol %. By controlling the amount of the terephthalic acid units with respect to total dicarboxylic acid structural units of the polyester resin (B) to the aforementioned ranges, the thermoplastic resin composition (C) exhibits remarkably excellent transparency and mechanical strength (Examples 1 to 3 and Comparative Examples 4 to 7).

In the case where the polyester resin (B) containing aromatic dicarboxylic acid units in an amount of 70 mol % or more with respect to total dicarboxylic acid structural units further contains 2,6-naphthalenedicarboxylic acid units in the aromatic dicarboxylic acid structural units, the amount of 2,6-naphthalenedicarboxylic acid units in the dicarboxylic acid structural units preferably 5 to 80 mol %, more preferably 20 to 70 mol %, particularly preferably 40 to 60 mol %. By controlling the amount of the 2,6-naphthalenedicarboxylic acid units with respect to total dicarboxylic acid structural units of the polyester resin (B) to the aforementioned ranges, the thermoplastic resin composition (C) exhibits remarkably excellent transparency, heat resistance, and resistance to chemicals (Examples 8 and 9 and Comparative Examples 3 to 7).

In addition to the aforementioned aromatic dicarboxylic acid components, a polyvalent carboxylic acid compound having, in one molecule, three or more carboxylic groups bonded to an aromatic ring may be employed as a raw material monomer for the polyester resin (B). Alternatively, a similar polyvalent carboxylic acid compound having three or more carboxyl groups bonded to an aromatic ring, with two or more carboxyl groups forming an anhydride ring may also be employed. Examples of such carboxylic acid compounds include trimellitic acid, pyromellitic acid, trimellitic anhydride, naphthalenetricarboxylic anhydrixdes having different carboxylic group bonding positions on the aromatic ring, anthracenetricarboxylic acids, benzophenonetricarboxylic anhydrides, benzenetetracarboxylic monoanhydride, naphthalenetetracarboxylic dianhydrides, anthracenetetracarboxylic dianhydrides, biphenyltetracarboxylic dianhydrides, and ethylenebis(trimellitic anhydride).

The raw material monomers for the polyester resin (B) may include a hydroxy acid such as glycolic acid, lactic acid, 2-hydroxyisobutyric acid, or 3-hydroxyisobutyric acid or a monocarboxylic acid such as benzoic acid, propionic acid, or butyric acid, in such an amount that does not impede the objects of the present invention.

No particular limitation is imposed on the method for producing the polyester resin (B) of the present invention, and any conventionally known method can be employed. Examples include melt polymerization such as transesterification and direct esterification, and solution polymerization. No particular limitation is imposed on the transesterification catalyst and esterification catalyst, and any conventionally known catalysts can be used. Examples of the catalysts include sodium alkoxides and magnesium alkoxides; aliphatic acid salts, carbonates, phosphates, hydroxides, chlorides, and oxides of zinc, lead, cerium, cadmium, manganese, cobalt, lithium, sodium, potassium, calcium, nickel, magnesium, vanadium, aluminum, titanium, germanium, antimony, or tin; and metallic magnesium. These catalysts may be used singly or in combination of two or more species. No particular limitation is imposed on the polycondensation catalyst, and any conventionally known catalysts can be used. For example, the aforementioned catalysts can be used. These catalysts may be used singly or in combination of two or more species.

Upon production of the polyester resin (B), known etherification-preventing agents, stabilizers such as a heat stabilizer and a photostablizer; polymerixation regulators may be used. Specific examples of etherification-preventing agents include amine compounds. Addition, as a heat stabilizer, of any of a variety of phosphorus compounds such as phosphoric acid, phosphorous acid, and phenylphosphonic acid is also effective. Other additives such as a photostabilizer, an antistatic agent, a lubricant, an antioxidant, a releasing agent, a dye, and a pigment may also added.

The polyester (B) preferably has a glass transition temperature, as measured by means of a differential scanning calorimeter, of 70° C. or higher, more preferably 80° C. or higher, particularly preferably 90° C. or higher. When the glass transition temperature of the polyester resin (B) falls within the above ranges, the thermoplastic resin composition (C) exhibits remarkably excellent heat resistance.

Upon mixing with the polycarbonate resin (A), the polyester resin (B) is preferably dried so as to attain a water content in the resin of 300 ppm or lower, preferably 100 ppm or lower. By controlling the water content so as to fall within the above ranges, deterioration of the polyester resin (B) during melt kneading with the polycarbonate resin (A) can be prevented. No particular limitation is imposed on the intrinsic viscosity (as measured at 25° C., in a mixture solvent of phenol and 1,1,2,2-tetrachloroethane (6/4 by mass)) of the polyester resin (B) used in the present invention. However, the viscosity is generally 0.3 to 2.0 dL/g, preferably 0.4 to 1.8 dL/g. An intrinsic viscosity of 0.3 or higher means that the polyester resin (B) has satisfactorily high molecular weight. Thus, molded products of the thermoplastic resin composition (C) employing such a polyester resin exhibits remarkably excellent mechanical strength.

The polyester resin (B) preferably has a melt viscosity, as measured at 240° C. and a shear rate of 100 s$^{-1}$, of 300 to 5,000 Pa·s, more preferably 500 to 2,000 Pa·s. A melt viscosity falling within the above ranges means that the polyester resin (B) can be well mixed with the polycarbonate resins (A) during melt mixing. Thus, the thermoplastic resin composition (C) exhibiting excellent transparency and mechanical strength can be produced.

The polyester resin (B) preferably has a molecular weight distribution factor of 2.5 to 12.0, more preferably 2.5 to 8.0. When the molecular weight distribution factor falls within the above ranges, the polyester resin has remarkably excellent moldability suitable for molding into products such as film, sheets, and thin hollow container.

As used herein, the term "molecular weight distribution factor" refers to a ratio of weight average molecular weight (Mw) to number average molecular weight (Mn); i.e., Mw/Mn. The molecular weight distribution factor can be controlled by tuning the time of addition of a diol having a cyclic acetal skeleton, molecular weight of the polyester resin (B), polymerization temperature, and type of additives.

The thermoplastic resin composition (C) of the present invention includes a polycarbonate resin (A) in an amount of 2.0 to 99.5 wt. %, preferably 5 to 99.0 wt. %, more preferably 10 to 95 wt. % and a polyester resin (B) in an amount of 98.0 to 0.5 wt. %, preferably 95 to 1.0 wt. %, more preferably 90 to 5 wt. %, the polyester resin (B) containing diol units each having a cyclic acetal skeleton in an amount of 20 to 60 mol % with respect to total diol structural units.

When the thermoplastic resin composition (C) includes a polycarbonate resin (A) in an amount of 99.5 wt. % or less and a polyester resin (B) in an amount of 0.5 wt. % or more, resistance to chemicals of the polycarbonate resin (A) is considerably improved, and moldability and printability of the resin are also improved. Notably, when the thermoplastic resin composition (C) includes a polyester resin (B) in an amount of 0.3 wt. % or more, chemical resistance effect of the polycarbonate resin (A) is provided. When the thermoplastic resin composition (C) includes a polycarbonate resin (A) in an amount of 2.0 wt. % or more and a polyester resin (B) in an amount of 98.0 wt. % or less, mechanical strength (particularly impact strength) and heat resistance of the polyester resin (B) are improved.

The thermoplastic resin composition (C) is produced by mixing components through a conventionally known method. In one exemplified procedure, a polycarbonate resin (A) and a polyester resin (B) are dry blended by means of a tumbler, a V-blender, a Henschel mixer, or a similar apparatus, to thereby form a mixture. The mixture is melt-mixed at least once by means of a single-screw extruder, a twin-screw extruder, a kneader, or a similar apparatus. In accordance with need, the mixture undergoes solid phase polymerization in high vacuum or under inert gas.

From the viewpoint of transparency, the thermoplastic resin composition (C) preferably exhibits a total luminous transmittance of 87% or higher as measured on a piece of the product having a thickness of 3.2 mm, more preferably 88% or higher, particularly preferably 89% or higher. The haze value is preferably 4% or less, more preferably 3% or less, particularly preferably 2% or less.

The thermoplastic resin composition (C) preferably has a glass transition temperature, as measured by means of a differential scanning calorimeter, of 90° C. or higher, more preferably 110° C. or higher, particularly preferably 130° C. or higher. When the glass transition temperature of the thermoplastic resin composition (C) falls within the above ranges, the thermoplastic resin composition (C) exhibits remarkably excellent heat resistance.

From the viewpoint of impact resistance, the thermoplastic resin composition (C) preferably has an impact strength (Izod impact strength, with notch) of 30 J/m or higher as measured on a piece of the molded product having a thickness of 3.2 mm, more preferably 50 J/m or higher, particularly preferably 100 J/m or higher.

From the viewpoint of resistance to chemicals, the period of time until a crack is generated in a piece of the molded product of the thermoplastic resin composition (C) having a thickness of 3.2 mm immersed in a solution (carbon tetrachloride (75 parts by weight)/n-butanol (25 parts by weight), 25° C.), while application of a strain (percent deformation of 1%) to the piece is maintained, is preferably 5 seconds or longer, more preferably 7 seconds or longer, particularly preferably 10 seconds or longer.

From the viewpoint of printability, the percent cracked area of a piece of the extruded sheet of the thermoplastic resin composition (C) having a thickness of 1.0 mm, when the piece has been coated with a composition containing an ink (13-00215 White, slow dry-type D3N25-P, product of Teikoku Printing Inks Mfg. Co., Ltd.) and a solvent (Z-603, product of Teikoku Printing Inks Mfg. Co., Ltd.) (ink/solvent: 100/30 (wt.)) to a thickness of 60 μm, dried under air blow for 10 minutes, and dried at 80° C. for 10 minutes, is preferably 20% or less, more preferably 0%.

The thermoplastic resin composition (C) preferably has a melt viscosity, as measured at 240° C. and a shear rate of 100 $s^{-1}$, of 300 to 5,000 Pa·s, more preferably 500 to 2,000 Pa·s. When the melt viscosity of the thermoplastic resin composition (C) falls within the above ranges, moldability, particularly injection moldability, extrudability, or expansion moldability is enhanced. In addition, the molded products obtained from the thermoplastic resin composition (C) have excellent formability in vacuum forming and pressure forming and deep drawability as well as secondary workability in cold bending, drilling, punching, etc.

The characteristics of the thermoplastic resin composition (C) will be described in the following (I) to (III), which are categorized in accordance with the compositional ratio of the polycarbonate resin (A) to the polyester resin (B).

(I) In the case where the thermoplastic resin composition (C) contains a large amount of polycarbonate resin (A) and a small amount of polyester resin (B); i.e., when the thermoplastic resin composition (C) contains the polycarbonate resin (A) in an amount of preferably 60 to 99.5 wt. %, more preferably 70 to 95 wt. %, and the polyester resin (B) in an amount of preferably 40 to 0.5 wt. %, more preferably 30 to 5 wt. %, resistance to chemicals, moldability, and printability of components, mainly the polycarbonate (A), are remarkably improved without impairing transparency, mechanical strength, and heat resistance (see Examples 1 to 9, and 18 and Comparative Example 7).

Thus, the thermoplastic resin composition (C) having the aforementioned composition is excellent particularly in heat resistance, transparency, resistance to chemicals, and mechanical strength as well as in moldability and printability.

Specifically, the thermoplastic resin composition (C) having the aforementioned composition has physical properties described in the following (1) to (4).

(1) Heat resistance: a glass transition temperature, as measured by means of a differential scanning calorimeter, of 130° C. or higher.

(2) Impact resistance: an impact strength, as determined through the Izod impact test with notch, of 100 J/m or higher.

(3) Resistance to chemicals: a period of time until a crack is generated in an injection molded piece upon immersion in a mixture solution containing carbon tetrachloride in an amount of 75 parts by weight and n-butanol in an amount of 25 parts by weight, while a strain of 1% is applied to the piece, of 5 seconds or longer.

(4) Transparency: a total luminous transmittance of 87% or higher and a haze value of 4% or less, as measured on a molded piece having a thickness of 3.2 mm.

(II) In the case where the thermoplastic resin composition (C) contains comparable amounts of polycarbonate resin (A) and polyester resin (B), i.e., when the thermoplastic resin composition (C) contains the polycarbonate resin (A) in an amount of preferably 30 to 70 wt. %, more preferably 40 to 60 wt. %, and the polyester resin (B) in an amount of preferably 70 to 30 wt. %, more preferably 60 to 40 wt. %, the polycarbonate (A) has remarkably excellent resistance to chemicals, moldability, and printability, and the polyester resin (B) has remarkably excellent heat resistance and mechanical strength (particularly impact strength) among others (see Examples 10 to 12 and Comparative Examples 7 to 11).

Thus, the thermoplastic resin composition (C) having excellent heat resistance, mechanical strength, resistance to chemicals, moldability, and printability can be obtained without impairing transparency of the polycarbonate resin (A) and the polyester resin (B). Specifically, the thermoplastic resin composition (C) having the aforementioned composition has physical properties described in the following (1) to (4).

(1) Heat resistance: a glass transition temperature, as measured by means of a differential scanning calorimeter, of 110° C. or higher.

(2) Impact resistance: an impact strength, as determined through the Izod impact test with notch, of 30 J/m or higher.

(3) Resistance to chemicals: a period of time until a crack is generated in an injection molded piece upon immersion in a mixture solution containing carbon tetrachloride in an amount of 75 parts by weight and n-butanol in an amount of 25 parts by weight, while a strain of 1% is applied to the piece, of 7 seconds or longer.

(4) Transparency: a total luminous transmittance of 87% or higher and a haze value of 4% or less, as measured on a molded piece having a thickness of 3.2 mm.

(III) In the case where the thermoplastic resin composition (C) contains a small amount of polycarbonate resin (A) and a large amount of polyester resin (B), i.e., when the thermoplastic resin composition (C) contains the polycarbonate resin (A) in an amount of preferably 0.5 to 40 wt. %, more preferably 5 to 30 wt. %, and the polyester resin (B) in an amount of preferably 99.5 to 60 wt. %, more preferably 95 to 70 wt. %, the polyester resin (B) has improved heat resistance and mechanical strength (particularly impact resistance) among others (see Examples 13 to 17 and Comparative Examples 8 to 11).

Thus, the thermoplastic resin composition (C) having improved heat resistance and mechanical strength and excellent resistance to chemicals, moldability, and printability can be obtained without impairing transparency of the polyester resin (B). Specifically, the thermoplastic resin composition (C) having the aforementioned composition has physical properties described in the following (1) to (4).

(1) Heat resistance: a glass transition temperature, as measured by means of a differential scanning calorimeter, of 90° C. or higher.

(2) Impact resistance: an impact strength, as determined through the Izod impact test with notch, of 30 J/m or higher.

(3) Resistance to chemicals: a period of time until a crack is generated in an injection molded piece upon immersion in a mixture solution containing carbon tetrachloride in an amount of 75 parts by weight and n-butanol in an amount of 25 parts by weight, while a strain of 1% is applied to the piece, of 10 seconds or longer.

(4) Transparency: a total luminous transmittance of 87% or higher and a haze value of 4% or less, as measured on a molded piece having a thickness of 3.2 mm.

The thermoplastic resin composition (C) of the present invention may further contain an additive such as a pigment, a dye, a lubricant, a matting agent, a thermal stabilizer, an anti-weathering agent, a UV-absorber, a nucleating agent, a plasticizer, a fire retardant, or an antistatic agent, so long as the effect of the present invention is not impaired.

The thermoplastic resin composition (C) may further contain a reclaimed polyethylene terephthalate product, a reclaimed product of modified polyethylene terephthalate containing a small amount of an isophthalic acid component, a reclaimed polycarbonate product, and/or a reclaimed product of polyester resin and/or polycarbonate resin below standards, so long as the nature of the resin composition is not varied.

The thermoplastic resin composition (C) is suitably processed through injection molding, extrusion, blow molding, or expansion molding. Through such a molding process, the thermoplastic resin composition (C) is molded into a variety of products such as injection molded products, mono-layer or multi-layer sheets and molded sheets, mono-layer or multi-layer films, heat shrinkable films, hollow containers, sheet foam products, beads foam products, fiber, calender-rolled products, profile extruded products, and eye glass lenses. In addition, the resin composition can be applied to a variety of uses such as liquid paints, powder paints, toners, and adhesives. Among them, the resin composition is particularly suitably molded into injection molded products, sheets, and films.

No particular limitation is imposed on the method for producing injection molded products from the thermoplastic resin composition (C), and a conventionally known method can be employed. In one exemplified method, the thermoplastic resin composition (C) is fed to an injection molding apparatus and injected into a metallic mold of a predetermined shape at a melting temperature of the thermoplastic resin composition (C), followed by cooling the composition in the metallic mold for solidification, thereby producing a molded product. The injection molded product obtained from the thermoplastic resin composition (C) exhibits a haze value, as measured on a piece of the product having a thickness of 3.2 mm, of 4.0% or less, preferably 3.0% or less, more preferably 2.0% or less, and exhibits a total luminous transmittance of 87% or higher, preferably 88% or higher, more preferably 89% or higher. Thus, the thermoplastic resin composition has excellent transparency. The injection molded product obtained from the thermoplastic resin composition (C) preferably has a deflection temperature under load (1.82 MPa), as measured on a piece of the product having a thickness of 3.2 mm, of 80° C. or higher, more preferably 100° C. or higher, particularly preferably 120° C. or higher. The thermoplastic resin composition (C) having a deflection temperature under load falling within the above ranges has excellent heat resistance among other properties.

No particular limitation is imposed on the method for producing sheets from the thermoplastic resin composition (C), and a conventionally known method can be employed. For example, such sheets can be produced though extrusion or casting. The sheet obtained from the thermoplastic resin composition (C) exhibits a total luminous transmittance, as measured on a piece of the sheet having a thickness of 1.0 mm, of 87% or higher, preferably 88% or higher, more preferably 89% or higher. Thus, the thermoplastic resin composition has excellent transparency. In addition, the sheet obtained from the thermoplastic resin composition (C) has excellent formability in vacuum forming and pressure forming and deep drawability as well as secondary workability in cold bending, drilling, punching, etc.

No particular limitation is imposed on the method for producing films from the thermoplastic resin composition (C), and a conventionally known method can be employed. Examples of the method include roll drawing, large-roll-nip drawing, and tenter drawing. The formed film through drawing may have shape such as flat film, tube-like shape, etc. The film obtained from the thermoplastic resin composition (C) exhibits a haze value, as measured on a piece of the film having a thickness of 1.0 mm, of 4.0% or less, preferably 3.0% or less, more preferably 2.0% or less. Thus, the thermoplastic resin composition has excellent transparency.

To the thermoplastic resin composition (C) of the present invention (100 parts by weight), an organic and/or inorganic filler is added in an amount of 0.1 to 150 parts by weight, preferably 1 to 130 parts by weight, more preferably 10 to 100 parts by weight, thereby producing a thermoplastic resin composition (D) having excellent properties such as mechanical strength and heat resistance.

No particular limitation is imposed on the type of the organic filler, and examples include carbon fiber; fluorine-containing resins such as polytetrafluoroethylene; ABS resins; polymethacrylate resins; polyolefins such as polyethylene and polypropylene; elastomers such as polyolefin elastomer and polyamide elastomer; polyester resins; polyamide resins; polyurethane resins; and ionomers. No particular limitation is imposed on the type of the inorganic filler, and examples include glass fiber, glass beads, glass flakes, fibrous magnesium, potassium titanate whiskers, ceramic whiskers, talc, mica, titanium oxide, montmorillonite, and clay (see Example 19).

The thermoplastic resin composition (D) of the present invention can be suitably processed through injection molding, extrusion, blow molding, or expansion molding. Through such a molding process, the thermoplastic resin composition of the present invention is molded into a variety of products such as injection molded products, mono-layer or multi-layer sheets and molded sheets, hollow containers, sheet foam products, beads foam products, calender-rolled products, and profile extruded products.

No particular limitation is imposed on the method for producing injection molded products from the thermoplastic resin composition (D) of the present invention, and a conventionally known method can be employed. In one exemplified method, the thermoplastic resin composition is fed to an injection molding apparatus and injected into a metallic mold of a predetermined shape at a melting temperature of the thermoplastic resin composition, followed by cooling the composition in the metallic mold, thereby producing a molded product.

EXAMPLES

The present invention will next be described in more detail by way of Examples and Comparative Examples. The method for producing samples to be evaluated in the Examples and Comparative Examples and the method for measuring physical properties are as follows.

Production of Polyester Resin (B), Production Examples 1 to 13

To a polyester production apparatus (150 L) equipped with a rectifying column (packed column), a partial condenser, a total condenser, a cold trap, agitation paddles, a heater, and a nitrogen conduit, monomers were fed in proportions shown in Table 1. To the monomers, manganese acetate tetrahydrate was added in an amount of 0.03 mol % with respect to the total amount of dicarboxylic acid components, and the mixture was heated at ambient pressure under nitrogen to 200° C. so as to perform transesterification. After conversion of the entire dicarboxylic acid component had increased to 90 mol % or higher, 0.02 mol % (based on the entire dicarboxylic acid component) antinomy trioxide and 0.06 mol % trimethyl phosphate were added to the reaction mixture. While remaining ethylene glycol was removed from the reaction system to the outside through gradually elevating the temperature and reducing the pressure, polycondensation was performed at a reached temperature of 270 to 300° C. and 0.3 kPa or lower. The viscosity of the reaction product gradually increased, and reaction was terminated when the melt viscosity reached an appropriate value, thereby producing the polyester resin (B) of the present invention.

<Evaluation of Polyester Resin (B)>

Polyester resins (B) were evaluated through the following procedure. Table 2 shows results of evaluation.

(1) Intrinsic Viscosity (IV)

Intrinsic viscosity of each polyester resin (B) sample was determined at constant 25° C. by use of a mixture solvent (ratio by mass: phenol/1,1,2,2-tetrachloroethane=6/4).

(2) Molecular Weight Distribution (Mw/Mn)

Molecular weight distribution factor of each polyester resin (B) sample was determined through gel permeation chromatography (GPC), and calibrated with respect to polystyrene as a standard. GPC was performed by means of TOSHO 8020 (product of TOSOH Corporation, two columns of TSK $GMH_{HR-L}$ and one column of TSK $G5000_{HR}$ being connected, these columns are also products of TOSOH Corporation) at a column temperature of 40° C. Chloroform serving as an eluent was caused to flow at 1.0 mL/min, and detection was carried out by means of a UV detector.

(3) Diol Units Having a Cyclic Acetal Skeleton Included in the Entire Diol Structural Unit of Polyester Resin The amount of diol units having a cyclic acetal skeleton with respect to the total diol structural units of the polyester resin was calculated through $^1$H-NMR measurement. The measurement was performed by use of NM-AL 400 (product of JEOL Ltd.) at 400 MHz with heavy chloroform as a solvent.

Examples 1 to 17, Comparative Examples 1 to 6

Polycarbonate resin (A) employed was a polycarbonate resin (trade name: Iupilon S-3000, product of Mitsubishi Engineering-Plastics Corpotation, Mv: $2.3 \times 10^4$).

(1) Production of Thermoplastic Resin Composition (C)

Polycarbonate resin (A) and polyester resin (B) were mixed by use of a tumbler at a compositional proportion shown in Tables 3 to 10, thereby produce each resin mixture. The resin mixture was melt-mixed by use of a twin-screw extruder (screw diameter: 37 mm, L/D: 42) under the following conditions: cylinder temperature of 265° C. to 285° C., die temperature 265° C. to 285° C., and screw speed of 100 rpm.

(2) Production of Injection Molded Products

Each of the thus-produced thermoplastic resin composition (C) samples was molded by use of a screw-type injection molding apparatus (screw diameter: 32 mm, clamping pressure: 9.8 kN) at a cylinder temperature of 260° C. to 280° C. and a metallic mold temperature of 35° C., thereby forming test pieces having a thickness of 3.2 mm.

(3) Production of Sheets

Each of the thus-produced thermoplastic resin composition (C) samples was molded by use of a twin-screw extruder (screw diameter: 20 mm, L/D: 25) through the T-die method under the following conditions: cylinder tempera ture of 265° C. to 285° C., T-die temperature 265° C. to 285° C., and screw speed of 50 rpm, thereby forming sheet samples having a thickness of 1.0 mm.

(4) Production of Films

Each sheet sample having a thickness of 100 μm which had been produced under the conditions as described in (3) above was biaxially stretched (2.2×2.2, simultaneously) at a temperature higher than the glass transition temperature of each thermoplastic resin composition (C) sample by 10 to 20° C.

Example 18

The procedure of Example 1 was repeated, except that a polycarbonate resin (product of Mitsubishi Engineering Plastics, Mv: 2.3×10⁴) composed of the repeating unit:

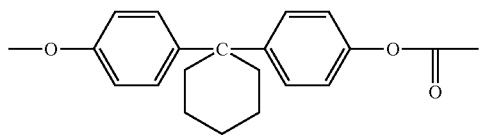

serving as polycarbonate resin (A) was used.

Example 19

The procedure of Example 3 was repeated, except that polycarbonate resin (A), polyester resin (B), and glass fiber as a filler were used as raw materials for producing the thermoplastic resin compositions (C) in amounts shown in Table 8.

Comparative Example 7

The procedure of Example 1 was repeated, except that the production step of each thermoplastic resin composition by use of a twin-screw extruder was not carried out.

Comparative Examples 8 to 11

The procedure of Comparative Example 7 was repeated, except that production of injection molded products was performed under the following conditions: cylinder temperature of 240° C. to 280° C. and a metallic mold temperature 35° C., and that production of sheets was performed under the following conditions: cylinder temperature of 240° C. to 280° C., T-die temperature 240° C. to 280° C., and screw speed of 50 rpm.

<Method of Evaluation>

The method of evaluating the resin compositions of Examples 1 to 19 and Comparative Examples 1 to 11 is as follows. Results of the evaluation are collectively shown in Tables 3 to 11.

(1) Haze Value and Total Luminous Transmittance:

Measurement was performed on injection molded product samples (thickness: 3.2 mm), sheet samples (thickness: 1.0 mm), and film samples (thickness: 20 μm), in accordance with JIS K7105 and ASTM D1003.

The measurement apparatus employed was a haze meter (model: COH-300A, product of Nippon Denshoku Industries Co., Ltd.).

(2) Deflection Temperature under Load

Deflection temperature was measured under a load of 1.82 MPa in accordance with ASTM D648.

(3) Glass Transition Temperature

Glass transition temperature (Tgm) of each polyester resin was measured by use of a DSC/TA-50WS (product of Shimadzu Corporation). A sample (about 10 mg) was placed in a non-sealed aluminum container and heated under nitrogen flow (30 mL/min) at an elevation rate of 20° C./min.

The temperature corresponding to the ½ value of the difference in height of two base lines (before and after transition) drawn along the DSC curve was regarded as the glass transition temperature.

(4) Resistance to Chemicals <1>

The period of time until a crack is generated in the surface of a test piece (molded product) having a thickness of 3.2 mm coated with a test chemical at 25° C., while application of a strain (percent deformation of 0.5%) to the piece is maintained, was measured.

The test chemical used was dioctyl phthalate (product of Tokyo Kasei Kogyo Co., Ltd.).

(5) Resistance to Chemicals <2>

The period of time until a crack is generated in a test piece (molded product) having a thickness of 3.2 mm immersed in a solution (carbon tetrachloride (75 parts by weight)/n-butanol (25 parts by weight), 25° C.), while application of a strain (percent deformation of 1%) to the piece is maintained, was measured (number of runs: 5).

(6) Impact Resistance

Each test piece having a thickness of 3.2 mm was subjected to the Izod impact test (with notch) in accordance with JIS K7110.

(7) Printability

To each sheet sample having a thickness of 1.0 mm, a mixture containing an ink (13-00215 White, slow dry-type D3N25-P, product of Teikoku Printing Inks Mfg. Co., Ltd.) and a solvent (Z-603, product of Teikoku Printing Inks Mfg. Co., Ltd.) (ink/solvent: 100/30 (wt.)) was applied to a thickness of 60 μm by use of an applicator. The percent cracked area of the ink-coated portion of the sample, when the sample had been dried under air blow for 10 minutes and further dried at 80° C. for 10 minutes was measured (number of runs: 5).

(8) Formability

Formability of each sheet sample having a thickness of 1.0 mm during vacuum forming or pressure forming (draw ratio: 1.5) was visually observed and evaluated on the basis of the following ratings.

○: Formable to attain the shape of metallic mold

Δ: Forming incomplete

X: Vacuum forming or pressure forming not possible

Notably, in Tables 1 and 2, dimethyl terephthalate was abbreviated as "DMT," dimethyl 2,6-naphthalenedicarboxylate as "NDC,", dimethyl isophthalate as "DMI," ethylene glycol as "EG," 1,4-cyclohexanedimethanol as "CHDM," 3,9-bis(1,1-dimethyl-2-hydroxyethyl)-2,4,8,10-tetraoxaspiro[5.5]undecan as "SPG," 5-methylol-5-ethyl-2-(1,1-dimethyl-2-hydroxyethyl)-1,3-dioxane as "DOG," intrinsic viscosity as "IV," and molecular weight distribution factor as "Mw/Mn."

TABLE 1

| Production Example No. | Dicarboxylic acid components (mol) | | | Diol components (mol) | | | |
|---|---|---|---|---|---|---|---|
| | DMT | NDC | DMI | EG | SPG | DOG | CHDM |
| Pro. Ex. 1 | 277 | — | — | 444 | 28 | — | — |
| Pro. Ex. 2 | 249 | — | — | 399 | 50 | — | — |
| Pro. Ex. 3 | 227 | — | — | 385 | 68 | — | — |
| Pro. Ex. 4 | 184 | — | — | 360 | 101 | — | — |
| Pro. Ex. 5 | 166 | — | — | 299 | 116 | — | — |
| Pro. Ex. 6 | 251 | — | — | 427 | — | 75 | — |
| Pro. Ex. 7 | 249 | — | — | 348 | — | — | 149 |
| Pro. Ex. 8 | 204 | — | 23 | 385 | 68 | — | — |
| Pro. Ex. 9 | 175 | 44 | — | 350 | 77 | — | — |
| Pro. Ex. 10 | 35 | 141 | — | 360 | 79 | — | — |
| Pro. Ex. 11 | 312 | — | — | 531 | — | — | — |
| Pro. Ex. 12 | 122 | 122 | — | 487 | — | — | — |
| Pro. Ex. 13 | — | 200 | — | 400 | — | — | — |

TABLE 2

| | IV | Mw/Mn | Percent copolymerization of diol having a cyclic acetal skeleton (mol %) |
|---|---|---|---|
| Pro. Ex. 1 | 0.70 | 3.0 | 10 |
| Pro. Ex. 2 | 0.70 | 3.0 | 20 |
| Pro. Ex. 3 | 0.70 | 3.1 | 30 |
| Pro. Ex. 4 | 0.70 | 3.5 | 55 |
| Pro. Ex. 5 | 0.66 | 3.5 | 70 |
| Pro. Ex. 6 | 0.70 | 3.0 | 30 |
| Pro. Ex. 7 | 0.70 | 3.0 | 0 |
| Pro. Ex. 8 | 0.70 | 3.0 | 30 |
| Pro. Ex. 9 | 0.69 | 3.1 | 30 |
| Pro. Ex. 10 | 0.70 | 3.4 | 45 |
| Pro. Ex. 11 | 0.70 | 2.8 | 0 |
| Pro. Ex. 12 | 0.68 | 3.1 | 0 |
| Pro. Ex. 13 | 0.71 | 2.9 | 0 |

TABLE 3

| | Example No. | | | |
|---|---|---|---|---|
| | Ex. 1 | Ex. 2 | Ex. 3 | Ex. 4 |
| Production of polyester resin | Pro. Ex. 3 | Pro. Ex. 3 | Pro. Ex. 3 | Pro. Ex. 3 |
| Composition of thermoplastic resin (wt. %) | | | | |
| Polycarbonate resin (A) | 99.5 | 99 | 95 | 90 |
| Polyester resin (B) | 0.5 | 1 | 5 | 10 |
| Evaluation results of thermoplastic resin | | | | |
| Injection molded products | | | | |
| Haze (%) | 0.7 | 0.6 | 0.7 | 0.8 |
| Total luminous transmittance (%) | 90 | 90 | 90 | 90 |
| Glass transition temp. (° C.) | 159 | 158 | 156 | 153 |
| Deflection temp. under load (° C.) | 130 | 130 | 128 | 125 |
| Resistance to chemicals 1 (hr) | >72 | >72 | >72 | >72 |
| Resistance to chemicals 2 (sec) | 7 | 9 | 11 | 11 |
| Impact resistance (J/m) | >300 | >300 | >300 | >300 |
| Sheets | | | | |
| Total luminous transmittance (%) | 91 | 91 | 91 | 91 |
| Printability (%) | 20 | 20 | 0 | 0 |
| Formability | ○ | ○ | ○ | ○ |
| Films | | | | |
| Haze (%) | 0.5 | 0.4 | 0.4 | 0.4 |

TABLE 4

| | Example No. | | | |
|---|---|---|---|---|
| | Ex. 5 | Ex. 6 | Ex. 7 | Ex. 8 |
| Production of polyester resin | Pro. Ex. 6 | Pro. Ex. 2 | Pro. Ex. 6 | Pro. Ex. 9 |
| Composition of thermoplastic resin (wt. %) | | | | |
| Polycarbonate resin (A) | 80 | 99 | 99 | 99.5 |
| Polyester resin (B) | 20 | 1 | 1 | 0.5 |
| Evaluation results of thermoplastic resin | | | | |
| Injection molded products | | | | |
| Haze (%) | 0.8 | 2.3 | 1.5 | 0.6 |
| Total luminous transmittance (%) | 90 | 89 | 90 | 90 |
| Glass transition temp. (° C.) | 145 | 159 | 159 | 159 |
| Deflection temp. under load (° C.) | 117 | 130 | 130 | 130 |
| Resistance to chemicals 1 (hr) | >72 | >72 | >72 | >72 |
| Resistance to chemicals 2 (sec) | 10 | 6 | 8 | 12 |
| Impact resistance (J/m) | 100 | >300 | >300 | >300 |
| Sheets | | | | |
| Total luminous transmittance (%) | 91 | 90 | 91 | 91 |
| Printability (%) | 0 | 0 | 0 | 0 |
| Formability | ○ | ○ | ○ | ○ |
| Films | | | | |
| Haze (%) | 0.6 | 1.4 | 0.9 | 0.4 |

TABLE 5

| | Example No. | | |
|---|---|---|---|
| | Ex. 9 | Ex. 10 | Ex. 11 |
| Production of polyester resin | Pro. Ex. 10 | Pro. Ex. 3 | Pro. Ex. 3 |
| Composition of thermoplastic resin (wt. %) | | | |
| Polycarbonate resin (A) | 99.5 | 60 | 40 |
| Polyester resin (B) | 0.5 | 40 | 60 |
| Evaluation results of thermoplastic resin | | | |
| Injection molded products | | | |
| Haze (%) | 0.7 | 0.7 | 0.8 |
| Total luminous transmittance (%) | 90 | 90 | 90 |
| Glass transition temp. (° C.) | 159 | 137 | 125 |
| Deflection temp. under load (° C.) | 130 | 110 | 101 |
| Resistance to chemicals 1 (hr) | >72 | >72 | >72 |
| Resistance to chemicals 2 (sec) | 15 | 8 | 9 |
| Impact resistance (J/m) | >300 | 45 | 40 |
| Sheets | | | |
| Total luminous transmittance (%) | 91 | 91 | 91 |
| Printability (%) | 0 | 0 | 0 |
| Formability | ○ | ○ | ○ |
| Films | | | |
| Haze (%) | 0.5 | 0.7 | 0.7 |

TABLE 6

| | Example No. | | |
|---|---|---|---|
| | Ex. 12 | Ex. 13 | Ex. 14 |
| Production of polyester resin | Pro. Ex. 8 | Pro. Ex. 3 | Pro. Ex. 3 |
| Composition of thermoplastic resin (wt. %) | | | |
| Polycarbonate resin (A) | 50 | 20 | 10 |
| Polyester resin (B) | 50 | 80 | 90 |
| Evaluation results of thermoplastic resin | | | |
| Injection molded products | | | |
| Haze (%) | 1.1 | 0.8 | 0.7 |
| Total luminous transmittance (%) | 89 | 90 | 90 |

TABLE 6-continued

| | Example No. | | |
|---|---|---|---|
| | Ex. 12 | Ex. 13 | Ex. 14 |
| Production of polyester resin | Pro. Ex. 8 | Pro. Ex. 3 | Pro. Ex. 3 |
| Glass transition temp. (° C.) | 131 | 114 | 109 |
| Deflection temp. under load (° C.) | 106 | 91 | 86 |
| Resistance to chemicals 1 (hr) | >72 | >72 | >72 |
| Resistance to chemicals 2 (sec) | 11 | 11 | 11 |
| Impact resistance (J/m) | 43 | 38 | 37 |
| Sheets | | | |
| Total luminous transmittance (%) | 89 | 91 | 91 |
| Printability (%) | 0 | 0 | 0 |
| Formability | ○ | ○ | ○ |
| Films | | | |
| Haze (%) | 0.7 | 0.6 | 0.6 |

TABLE 7

| | Example No. | | |
|---|---|---|---|
| | Ex. 15 | Ex. 16 | Ex. 17 |
| Production of polyester resin | Pro. Ex. 3 | Pro. Ex. 2 | Pro. Ex. 4 |
| Composition of thermoplastic resin (wt. %) | | | |
| Polycarbonate resin (A) | 5 | 5 | 5 |
| Polyester resin (B) | 95 | 95 | 95 |
| Evaluation results of thermoplastic resin | | | |
| Injection molded products | | | |
| Haze (%) | 0.7 | 1.5 | 1.0 |
| Total luminous transmittance (%) | 90 | 88 | 89 |
| Glass transition temp. (° C.) | 106 | 101 | 118 |
| Deflection temp. under load (° C.) | 84 | 78 | 98 |
| Resistance to chemicals 1 (hr) | >72 | >72 | >72 |
| Resistance to chemicals 2 (sec) | 12 | 11 | 13 |
| Impact resistance (J/m) | 34 | 35 | 30 |
| Sheets | | | |
| Total luminous transmittance (%) | 90 | 89 | 89 |
| Printability (%) | 0 | 0 | 0 |
| Formability | ○ | ○ | ○ |
| Films | | | |
| Haze (%) | 0.5 | 1.1 | 0.9 |

TABLE 8

| | Example No. | |
|---|---|---|
| | Ex. 18 | Ex. 19 |
| Production of polyester resin | Pro. Ex. 3 | Pro. Ex. 3 |
| Composition of thermoplastic resin (wt. %) | | |
| Polycarbonate resin (A) | 95 | 95 |
| Polyester resin (B) | 5 | 5 |
| Filter | 0 | 30 |
| Evaluation results of thermoplastic resin | | |
| Injection molded products | | |
| Haze (%) | 0.7 | 1.5 |
| Total luminous transmittance (%) | 90 | 88 |
| Glass transition temp. (° C.) | 198 | 160 |
| Deflection temp. under load (° C.) | 168 | 135 |
| Resistance to chemicals 1 (hr) | >72 | >72 |
| Resistance to chemicals 2 (sec) | 10 | 11 |
| Impact resistance (J/m) | >300 | >300 |
| Sheets | | |
| Total luminous transmittance (%) | 90 | 89 |
| Printability (%) | 0 | 0 |
| Formability | ○ | Δ |
| Films | | |
| Haze (%) | 0.5 | 1.1 |

TABLE 9

| | Example No. | | | |
|---|---|---|---|---|
| | Comp. Ex. 1 | Comp. Ex. 2 | Comp. Ex. 3 | Comp. Ex. 4 |
| Production of polyester resin | Pro. Ex. 1 | Pro. Ex. 5 | Pro. Ex. 7 | Pro. Ex. 11 |
| Composition of thermoplastic resin (wt. %) | | | | |
| Polycarbonate resin (A) | 95 | 95 | 95 | 95 |
| Polyester resin (B) | 5 | 5 | 5 | 5 |
| Evaluation results of thermoplastic resin | | | | |
| Injection molded products | | | | |
| Haze (%) | 13 | 8 | 0.7 | 54 |
| Total luminous transmittance (%) | 84 | 85 | 89 | 78 |

TABLE 9-continued

|  | Example No. | | | |
|---|---|---|---|---|
| Production of polyester resin | Comp. Ex. 1 Pro. Ex. 1 | Comp. Ex. 2 Pro. Ex. 5 | Comp. Ex. 3 Pro. Ex. 7 | Comp. Ex. 4 Pro. Ex. 11 |
| Glass transition temp. (° C.) | 155 | 157 | 156 | 155 |
| Deflection temp. under load (° C.) | 128 | 129 | 128 | 127 |
| Resistance to chemicals 1 (hr) | >72 | >72 | <24 | <48 |
| Resistance to chemicals 2 (sec) | 6 | 9 | 1 | 1 |
| Impact resistance (J/m) | >300 | >300 | >300 | >300 |
| Sheets | | | | |
| Total luminous transmittance (%) | 85 | 86 | 89 | 79 |
| Printability (%) | 0 | 0 | 100 | 40 |
| Formability | ○ | ○ | ○ | ○ |
| Films | | | | |
| Haze (%) | 8 | 6 | 0.4 | 12 |

TABLE 10

|  | Example No. | | | |
|---|---|---|---|---|
| Production of polyester resin | Comp. Ex. 5 Pro. Ex. 12 | Comp. Ex. 6 Pro. Ex. 13 | Comp. Ex. 7 | Comp. Ex. 8 Pro. Ex. 3 |
| Composition of thermoplastic resin (wt. %) | | | | |
| Polycarbonate resin (A) | 95 | 95 | 100 | 0 |
| Polyester resin (B) | 5 | 5 | 0 | 100 |
| Evaluation results of thermoplastic resin | | | | |
| Injection molded products | | | | |
| Haze (%) | 23 | 61 | 0.7 | 0.7 |
| Total luminous transmittance (%) | 85 | 76 | 90 | 90 |
| Glass transition temp. (° C.) | 156 | 158 | 159 | 103 |
| Deflection temp. under load (° C.) | 128 | 129 | 130 | 81 |
| Resistance to chemicals 1 (hr) | <72 | >72 | <24 | >72 |
| Resistance to chemicals 2 (sec) | 4 | 7 | 1 | 10 |
| Impact resistance (J/m) | >300 | >300 | >300 | 25 |
| Sheets | | | | |
| Total luminous transmittance (%) | 85 | 76 | 90 | 90 |
| Printability (%) | 20 | 0 | 100 | 0 |
| Formability | ○ | ○ | X | ○ |
| Films | | | | |
| Haze (%) | 19 | 45 | 0.4 | 0.5 |

TABLE 11

|  | Example No. | | |
|---|---|---|---|
| Production of polyester resin | Ex. 9 Pro. Ex. 11 | Ex. 10 Pro. Ex. 12 | Ex. 11 Pro. Ex. 13 |
| Composition of thermoplastic resin (wt. %) | | | |
| Polycarbonate resin (A) | 0 | 0 | 0 |
| Polyester resin (B) | 100 | 100 | 100 |
| Evaluation results of thermoplastic resin | | | |
| Injection molded products | | | |
| Haze (%) | 2.5 | 0.8 | 1.7 |
| Total luminous transmittance (%) | 88 | 90 | 89 |
| Glass transition temp. (° C.) | 84 | 104 | 124 |
| Deflection temp. under load (° C.) | 68 | 78 | 88 |
| Resistance to chemicals 1 (hr) | <24 | <72 | >72 |
| Resistance to chemicals 2 (sec) | 4 | 7 | 10 |
| Impact resistance (J/m) | 20 | 18 | 19 |
| Sheets | | | |
| Total luminous transmittance (%) | 89 | 90 | 90 |
| Printability (%) | 20 | 0 | 0 |
| Formability | ○ | ○ | ○ |
| Films | | | |
| Haze (%) | 1.3 | 0.6 | 1.0 |

INDUSTRIAL APPLICABILITY

According to the present invention, a thermoplastic resin composition, which comprises a polycarbonate resin and a polyester resin containing diol units having a cyclic acetal skeleton in a predetermined amount with respect to total diol structural units and which has excellent transparency, mechanical strength, heat resistance, resistance to chemicals, moldability, and printability can be provided. The invention also provides an injection molded product, a sheet, and a film, each being produced from the thermoplastic resin composition. The invention further provides a thermoplastic resin composition, which comprises the above thermoplastic composition and an organic and/or inorganic filler added thereto and which has excellent mechanical strength, heat resistance, resistance to chemicals, moldability, and printability.

The invention claimed is:

1. A thermoplastic resin composition (C) comprising a polycarbonate resin (A) and a polyester resin (B), characterized in that the polyester resin (B) contains diol units each having a cyclic acetal skeleton in an amount of 20 to 60 mol % with respect to total diol structural units, and the thermoplastic resin composition (C) contains the polycarbonate resin (A) in an amount of 2 to 99.5 wt. % and the polyester resin (B) in an amount of 98 to 0.5 wt. %.

2. A thermoplastic resin composition (C) as described in claim 1, wherein the polycarbonate resin (A) includes repeating units represented by formula (1) and/or formula (2):

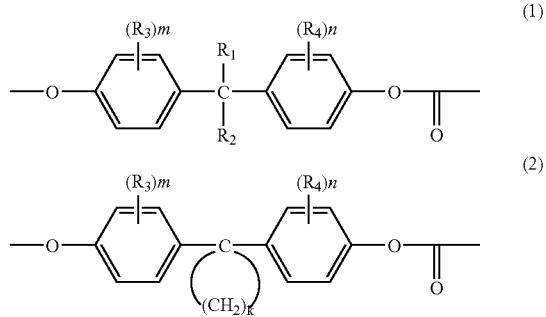

wherein each of $R_1$ and $R_2$ represents a hydrogen atom, a C1–C10 non-cyclic hydrocarbon group, or a C5–C10 alicyclic hydrocarbon group; and each of $R_3$ and $R_4$ represents a C1–C10 non-cyclic hydrocarbon group, a halogen atom, or a phenyl group; each of m and n is 0, 1, or 2; and k is 4 or 5.

3. A thermoplastic resin composition (C) as described in claim 1, wherein the polycarbonate resin (A) is a bisphenol A polycarbonate ester.

4. A thermoplastic resin composition (C) as described in claim 1, wherein the diol component having a cyclic acetal skeleton is represented by formula (3):

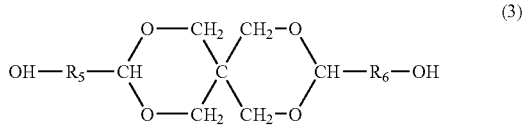

wherein each of $R_5$ and $R_6$ represents a functional group selected from the group consisting of a C1–C10 non-cyclic hydrocarbon group, a C3–C10 alicyclic hydrocarbon group, and a C6–C10 aromatic hydrocarbon group, or by formula (4):

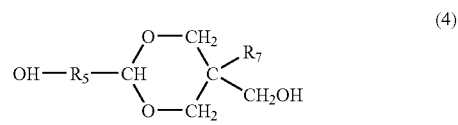

wherein $R_5$ has the same meaning as defined above; $R_7$ represents a functional group selected from the group consisting of a C1–C10 non-cyclic hydrocarbon group, a C3–C10 alicyclic hydrocarbon group, and a C6–C10 aromatic hydrocarbon group.

5. A thermoplastic resin composition (C) as described in claim 1, wherein the diol component having a cyclic acetal skeleton is 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

6. A thermoplastic resin composition (C) as described in claim 1, wherein the polyester resin (B) contains aromatic dicarboxylic acid units in an amount of 70 mol % or more with respect to total dicarboxylic acid structural units.

7. A thermoplastic resin composition (C) as described in claim 1, wherein the polyester resin (B) contains one or more dicarboxylic acid units selected from the group consisting of a terephthalic acid unit, a 2,6-naphthalenedicarboxylic acid unit, and an isophthalic acid unit in dicarboxylic acid structural units.

8. A thermoplastic resin composition (C) as described in claim 1, which has the following physical properties of (1) to (4):
(1) a glass transition temperature, as measured by means of a differential scanning calorimeter, of 90° C. or higher;
(2) an impact strength, as determined through the Izod impact test with notch, of 30 J/m or higher;
(3) a period of time until a crack is generated in an injection molded piece upon immersion in a mixture solution containing carbon tetrachloride in an amount of 75 parts by weight and n-butanol in an amount of 25 parts by weight at 25° C., while a strain of 1% is applied to the piece, of 5 seconds or longer; and
(4) a total luminous transmittance of 87% or higher and a haze value of 4% or less, as measured on a molded piece having a thickness of 3.2 mm.

9. A thermoplastic resin composition (C) as described in claim 8, which has the following physical properties of (1) and (2):
(1) a glass transition temperature, as measured by means of a differential scanning calorimeter, of 130° C. or higher; and
(2) an impact strength, as determined through the Izod impact test with notch, of 100 J/m or higher.

10. A thermoplastic resin composition (C) as described in claim 8, which has the following physical properties of (1) and (2):
(1) a glass transition temperature, as measured by means of a differential scanning calorimeter, of 110° C. or higher; and
(2) a period of time until a crack is generated in an injection molded piece upon immersion in a mixture solution containing carbon tetrachloride in an amount of 75 parts by weight and n-butanol in an amount of 25 parts by weight, while a strain of 1% is applied to the piece, of 7 seconds or longer.

11. A thermoplastic resin composition (C) as described in claim 8, which has a period of time until a crack is generated in an injection molded piece upon immersion in a mixture solution containing carbon tetrachloride in an amount of 75 parts by weight and n-butanol in an amount of 25 parts by weight at 25° C., while a strain of 1% is applied to the piece, of 10 seconds or longer.

12. An injection molded product produced from a thermoplastic resin composition (C) as recited in claim 1, the injection molded product exhibiting a total luminous transmittance of 87% or higher and a haze value of 4% or less as measured on a piece of the product having a thickness of 3.2 mm.

13. A sheet produced from a thermoplastic resin composition (C) as recited in claim 1, the sheet exhibiting a total luminous transmittance of 87% or higher as measured on a piece of the sheet having a thickness of 1.0 mm.

14. A film produced from a thermoplastic resin composition (C) as recited in claim 1, the film exhibiting a haze value of 4% or less as measured on a piece of the film having a thickness of 20 μm.

15. A thermoplastic resin composition (D) comprising a thermoplastic resin composition (C) as recited in claim 1 in an amount of 100 parts by weight and, added thereto, an organic and/or inorganic filler in an amount of 1 to 100 parts by weight.

16. A thermoplastic resin composition (C) as described in claim 2, wherein the polycarbonate resin (A) is a bisphenol A polycarbonate ester.

17. A thermoplastic resin composition (C) as described in claim 16, wherein the diol component having a cyclic acetal skeleton is represented by formula (3):

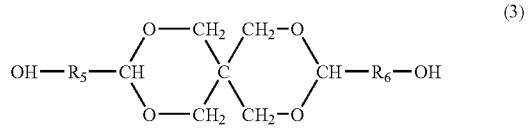

wherein each of $R_5$ and $R_6$ represents a functional group selected from the group consisting of a C1–C10 non-cyclic hydrocarbon group, a C3–C10 alicyclic hydrocarbon group, and a C6–C10 aromatic hydrocarbon group, or by formula (4):

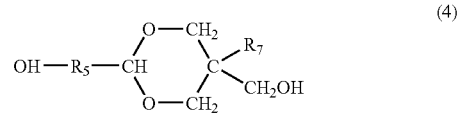

wherein $R_5$ has the same meaning as defined above; $R_7$ represents a functional group selected from the group consisting of a C1–C10 non-cyclic hydrocarbon group, a C3–C10 alicyclic hydrocarbon group, and a C6–C10 aromatic hydrocarbon group.

18. A thermoplastic resin composition (C) as described in claim 17, wherein the diol component having a cyclic acetal skeleton is 3,9-bis(1,1-dimethyl-2-hydroxyethyl)-2,4,8,10-tetraoxaspiro[5.5]undecane or 5-methylol-5-ethyl-2-(1,1-dimethyl-2-hydroxyethyl)-1,3-dioxane.

19. A thermoplastic resin composition (C) as described in claim 18, wherein the polyester resin (B) contains aromatic dicarboxylic acid units in an amount of 70 mol % or more with respect to total dicarboxylic acid structural units.

20. A thermoplastic resin composition (C) as described in claim 19, wherein the polyester resin (B) contains one or more dicarboxylic acid units selected from the group consisting of a terephthalic acid unit, a 2,6-naphthalenedicarboxylic acid unit, and an isophthalic acid unit in dicarboxylic acid structural units.

21. A thermoplastic resin composition (C) as described in claim 20, which has the following physical properties of (1) to (4):
  (1) a glass transition temperature, as measured by means of a differential scanning calorimeter, of 90° C. or higher;
  (2) an impact strength, as determined through the Izod impact test with notch, of 30 J/m or higher;
  (3) a period of time until a crack is generated in an injection molded piece upon immersion in a mixture solution containing carbon tetrachloride in an amount of 75 parts by weight and n-butanol in an amount of 25 parts by weight at 25° C., while a strain of 1% is applied to the piece, of 5 seconds or longer; and
  (4) a total luminous transmittance of 87% or higher and a haze value of 4% or less, as measured on a molded piece having a thickness of 3.2 mm.

22. A thermoplastic resin composition (C) as described in claim 21, which has the following physical properties of (1) and (2):
  (1) a glass transition temperature, as measured by means of a differential scanning calorimeter, of 130° C. or higher; and
  (2) an impact strength, as determined through the Izod impact test with notch, of 100 J/m or higher.

23. A thermoplastic resin composition (C) as described in claim 21, which has the following physical properties of (1) and (2):
  (1) a glass transition temperature, as measured by means of a differential scanning calorimeter, of 110° C. or higher; and
  (2) a period of time until a crack is generated in an injection molded piece upon immersion in a mixture solution containing carbon tetrachloride in an amount of 75 parts by weight and n-butanol in an amount of 25 parts by weight, while a strain of 1% is applied to the piece, of 7 seconds or longer.

24. A thermoplastic resin composition (C) as described in claim 21, which has a period of time until a crack is generated in an injection molded piece upon immersion in a mixture solution containing carbon tetrachloride in an amount of 75 parts by weight and n-butanol in an amount of 25 parts by weight at 25° C., while a strain of 1% is applied to the piece, of 10 seconds or longer.

25. An injection molded product produced from a thermoplastic resin composition (C) as recited in claim 24, the injection molded product exhibiting a total luminous transmittance of 87% or higher and a haze value of 4% or less as measured on a piece of the product having a thickness of 3.2 mm.

26. A sheet produced from a thermoplastic resin composition (C) as recited in claim 24, the sheet exhibiting a total luminous transmittance of 87% or higher as measured on a piece of the sheet having a thickness of 1.0 mm.

27. A film produced from a thermoplastic resin composition (C) as recited in claim 24, the film exhibiting a haze value of 4% or less as measured on a piece of the film having a thickness of 20 μm.

* * * * *